Mar. 13, 1923.

C. H. OERMAN

BUMPER FOR SLEDS

Filed Mar. 11, 1922

1,448,082

Inventor
Carl H. Oerman,
By Watson E. Coleman
Attorney

Patented Mar. 13, 1923.

1,448,082

UNITED STATES PATENT OFFICE.

CARL H. OERMAN, OF YORK, PENNSYLVANIA.

BUMPER FOR SLEDS.

Application filed March 11, 1922. Serial No. 543,056.

*To whom it may concern:*

Be it known that I, CARL H. OERMAN, a citizen of the United States, residing at York, in the county of York and State of Pennsylvania, have invented certain new and useful Improvements in Bumpers for Sleds, of which the following is a specification, reference being had to the accompanying drawings.

It is the purpose of the present invention to provide a yieldable bumper for sleds, especially the flexible type, wherein the forward portions of the runners are flexed, for the purpose of steering the sled in different directions.

Another purpose is the provision of a bumper, which is so yieldable, and so attached to the forward extremities of the upper portions of the runners, as to act to restore the forward portions of the runners to their normal positions, after being flexed for steering purposes.

While the bumper is yieldable, it possesses a reasonable amount of rigidity, by the action of which the forward portions of the runners are restored to their normal positions.

Still another purpose is to construct the bumper of any suitable material, preferably spring steel, either oval, flat or hexagon shape, etc., in cross section, and preferably highly polish nickel-plated, or otherwise covered or plated, to prevent corrosion. The invention also contemplates a bumper which may be constructed in various shapes, either half elliptical as shown, or otherwise formed.

It is the aim to terminate the ends of the bumper inwardly, and then forwardly, terminating in returned portions, which are attached to the inner faces of the sides of the runners, at a point below a connecting cross piece between the runners, it being obvious that the runners are constructed of spring steel, and in this case the ends of the bumper can be riveted to the rails 3, or to the runners, or to both.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1:
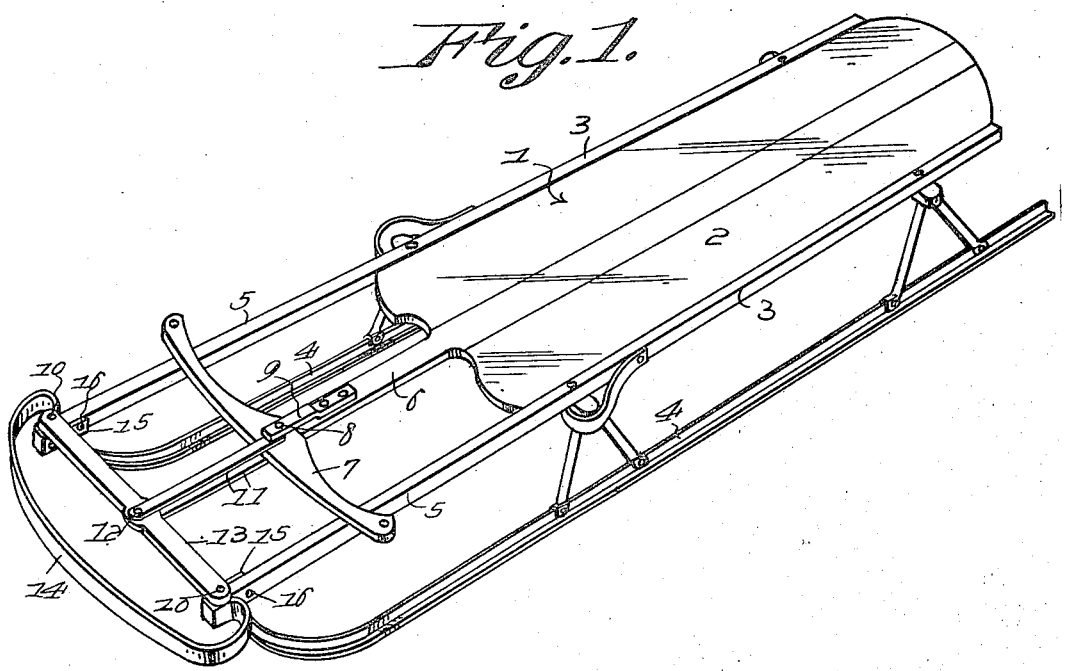
Figure 1 is a view in perspective of a sled, showing the same equipped with the bumper which is constructed in accordance with the invention.
Figure 2:
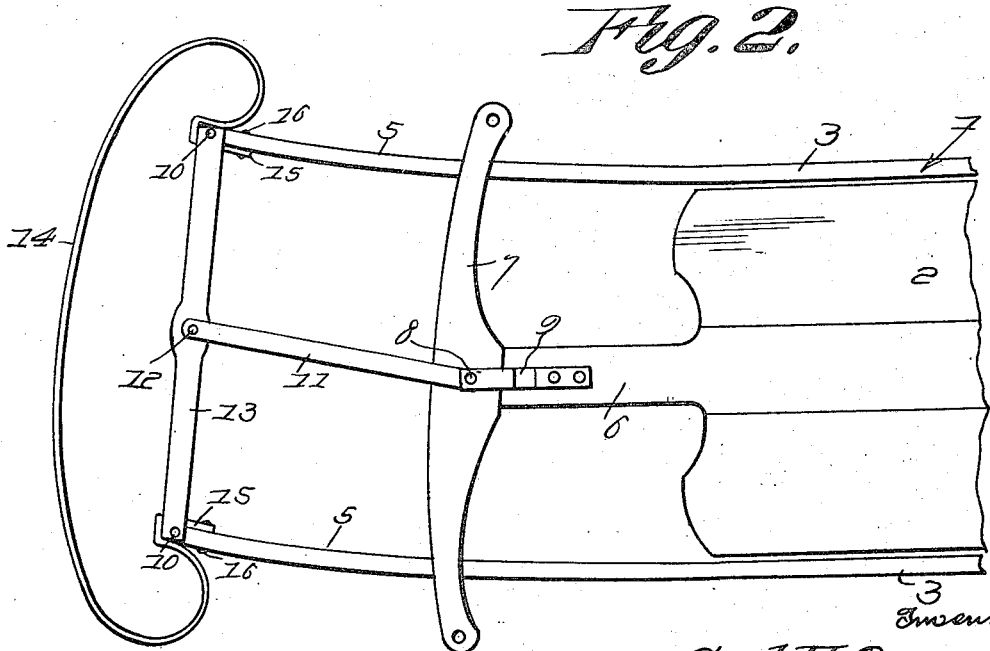
Figure 2 is an enlarged plan view of the forward ends of the runners with the bumper attached.

Referring to the drawings, 1 designates a conventional form of sled, which comprises the seat portion 2 and the side rails 3. The runners 4 of the sled are attached in the usual manner to the side rails 3. The present form of sled is of the flexible type, wherein the seat is mounted in the usual or conventional way, whereby it is capable of a slight oscillatory movement, for the purpose of steering the movement, as is common in this type of flexible sled.

The side rails extend forwardly of the anchoring connections between the runners and the rails. In fact the forward portions 5 of the side rails are flexible. The rails 3 are constructed of wood, the seat has a forward reduced extension 6, to which a steering bar 7 is pivotally attached as at 8. In order to reinforce the pivot, a plate or strap 9 is secured to the reduced extension 6 and also receives the pivot 8. The upper forward ends of the runners 4 are secured pivotally as at 10 to the forward extremities of the flexible portions of the rails 3.

Upper and lower metallic bars or straps 11 are connected to the pivot 8, and are in turn pivoted at 12, to a connecting bar 13, which pivotally connects the forward extremities of the rails 3.

A bumper 14, constructed of any suitable metal, preferably spring steel is supplied. This bumper may be any suitable shape in cross section, for instance oval, flat, hexagon or otherwise constructed, and the forward portion of the bumper is arcuate in shape. The ends of the forward portion curve rearwardly, inwardly and then forwardly and terminate in returned portions 15, which are secured by means of rivets, bolts or the like 16 to the rails 3, or to the inner adjacent faces of the upper forward ends of the runners 4, or connected to both, thereby providing a secure connection to the rails, runners, or to both.

Obviously, the bumper, while it is yieldable or flexible to a substantial degree, for the purpose of absorbing the shock in case it comes in contact with an object in its path, also possesses a substantial amount of rigidity, acting to restore the forward flexible portions of the runners 4 to their normal positions, after being flexed.

In other words when the operator is riding upon the sled, the steering bar 7 is oscillated in one direction or the other, and due to the seat 2 being pivotally mounted, and due to its connections and the connections of the side rails 3 with the forward ends of the runners, the forward flexible portions of the runners are capable of flexing to one side or the other, causing the sled to steer to the right or the left. When this action is taking place, the bumper is to a certain degree distorted, and when put under this strain, the rigidity of the bumper, though it is reasonably flexible and yieldable, acts to restore the forward portions of the runners to their normal positions.

The invention having been set forth, what is claimed is:—

1. The combination with a sled, wherein the forward portions of the runners thereof are capable of flexing for steering purposes, a bar connecting the forward flexing extremities of the runners, and an arcuate bumper having its ends turned inwardly toward the extremities of the forward flexible portions of the runners so as to be distorted by the flexing of the runners and provided with attaching means, connecting the bumper to the junction where the runners and the bar unite.

2. The combination with a sled, wherein forward flexible steering runners are employed, of an arcuate spring bumper terminating in spring loops at its ends, and attaching means operatively connecting the extremities of the loops and the flexible portions of the runners, whereby upon flexing the steering runners, the bumper and its spring loops become distorted, so that the return of the flexible steering runners is assisted.

3. The combination with a sled, the runners thereof having forward flexible steering portions, a spring bumper extending transversely of the forward ends of the flexible steering portions of the runners and spaced forward therefrom, the ends of the bumper terminating in spring loops, the ends of the loops having extensions, and means connecting the extensions and the flexible portions of the runners, whereby upon flexing the steering portions, the bumper and the spring loops become distorted, so that the return of the steering portions is assisted.

4. The combination with a sled having a flexible steering portion, of a spring bumper extending transversely of the end of the flexible steering portion and operatively connected thereto, so as to be distorted, whereby the return of the flexible steering portions is assisted.

In testimony whereof I hereunto affix my signature.

CARL H. OERMAN.